United States Patent
Sudo et al.

(10) Patent No.: US 12,475,237 B2
(45) Date of Patent: Nov. 18, 2025

(54) SECURE COMPUTATION APPARATUS, SECURE COMPUTATION SYSTEM, SECURE COMPUTATION METHOD, AND PROGRAM

(71) Applicant: NTT, Inc., Tokyo (JP)

(72) Inventors: Hiroki Sudo, Musashino (JP); Dai Ikarashi, Musashino (JP)

(73) Assignee: NTT, Inc., Tokyo (JP)

( * ) Notice: Subject to any disclaimer, the term of this patent is extended or adjusted under 35 U.S.C. 154(b) by 134 days.

(21) Appl. No.: 18/566,678

(22) PCT Filed: Jun. 8, 2021

(86) PCT No.: PCT/JP2021/021741
§ 371 (c)(1),
(2) Date: Dec. 4, 2023

(87) PCT Pub. No.: WO2022/259366
PCT Pub. Date: Dec. 15, 2022

(65) Prior Publication Data
US 2024/0273219 A1    Aug. 15, 2024

(51) Int. Cl.
*G06F 21/60*    (2013.01)
(52) U.S. Cl.
CPC .................. *G06F 21/602* (2013.01)
(58) Field of Classification Search
CPC ............. G06F 21/602; H04L 2209/046; H04L 2209/46; H04L 9/008; H04L 9/085
See application file for complete search history.

(56) References Cited

U.S. PATENT DOCUMENTS

2017/0308580 A1    10/2017    Naganuma et al.

FOREIGN PATENT DOCUMENTS

JP    5574402 B2    8/2014

OTHER PUBLICATIONS

Jung, Taeho, Xiang-Yang Li, and Meng Wan. "Collusion-tolerable privacy-preserving sum and product calculation without secure channel." IEEE Transactions on Dependable and secure computing 12.1 (2014): 45-57. (Year: 2015).*

(Continued)

*Primary Examiner* — Sangseok Park
(74) *Attorney, Agent, or Firm* — XSENSUS LLP (57) ABSTRACT

By using $[x_{0,0}], \ldots, [x_{0,r(0)-1}], \ldots, [x_{L-1,0}], \ldots, [x_{L-1,r(L-1)-1}]$ obtained by concealing L sets $X_0 = \{x_{0,0}, \ldots, x_{0,r(0)-1}\}, \ldots, X_{L-1} = \{x_{L-1,0}, \ldots, x_{L-1,r(L-1)-1}\}$, $[c_0], \ldots, [c_{m-1}]$ obtained by concealing the number $c_p$ of elements representing $k_p$ among $x_{0,0}, \ldots, x_{0,r(0)-1}, \ldots, x_{L-1,0}, \ldots, x_{L-1,r(L-1)-1}$ for $p=0, \ldots, m-1$ are obtained, $[eq_0], \ldots, [eq_{m-1}]$ obtained by concealing $eq_p = T$ when $c_p$ is L and $eq_p = F$ when $c_p$ is not L for $p=0, \ldots, m-1$ are obtained, and a data structure including $[k_p]$ and $[eq_p]$ associated with each other is output as a concealed operation result of a product set of $X_0, \ldots, X_{L-1}$.

6 Claims, 4 Drawing Sheets

(56) References Cited

OTHER PUBLICATIONS

Hamada et al., "Improved Algorithms for Computing Relational Algebra Operators for Secure Function Evaluation", The Institute of Electronics, Information and Communication Engineers, Technical Report of IEICE, LOIS2012-82,. vol. 112, No. 446, 2013, pp. 1-6 (12 pages including English Translation).

* cited by examiner

SECURE COMPUTATION APPARATUS, SECURE COMPUTATION SYSTEM, SECURE COMPUTATION METHOD, AND PROGRAM

CROSS-REFERENCE TO RELATED APPLICATION

The present application is based on PCT filing PCT/JP2021/021741, filed Jun. 8, 2021, the entire contents of which are incorporated herein by reference.

TECHNICAL FIELD

The present invention relates to a cryptographic technique, and in particular, to a secure computation technique.

BACKGROUND ART

A product set of sets A and B is denoted as A∩B. There is known a secret product set computation method for obtaining concealed information of a product set operation result of the sets A and B through secure computation while concealing the sets A and B by using the concealed information of the sets A and B as an input (refer to, for example, Non Patent Literature 1).

CITATION LIST

Non Patent Literature

Non Patent Literature 1: Koki Hamada, Dai Ikarashi, and Koji Chida, "Improved Algorithms for Computing Relational Algebra Operators for Secure Function Evaluation", IEICE Tech. Rep., LOIS2012-82, Vol. 112, No. 446, pp. 76-82, 2013.

SUMMARY OF INVENTION

Technical Problem

However, the conventional secret product set computation method is limited to a case where concealed information of two sets is used as an input. Thus, in order to obtain concealed information of a product set operation result of three or more sets by using concealed information of the three or more sets as an input, it is necessary to repeat secret product set computation using concealed information of two sets as an input. However, this method has a problem that the number of rounds increases as the number of sets to be subjected to a product set operation increases, and a part of processing becomes redundant between the rounds, which increases computation cost.

The present invention has been made in view of such circumstances, and an object of the present invention is to provide a technique capable of handling not only concealed information of two sets but also concealed information of three or more sets as a direct input, and capable of directly obtaining concealed information of a product set operation result of three or more sets.

Solution to Problem

In the present invention, a concealed operation result indicating concealed information of product sets of sets $X_0, \ldots, X_{L-1}$ is obtained while concealing L sets $X_0 = \{x_{0,0}, \ldots, x_{0,r(0)-1}\}, \ldots, X_{L-1} = \{x_{L-1,0}, \ldots, x_{L-1,r(L-1)-1}\}$ as follows. Here, L is an integer of 2 or greater, i=0, ..., L-1, r(i) is an integer of 1 or greater, j(i)=0, ..., r(i)-1, m is an integer of 1 or greater, $k_0, \ldots, k_{m-1}$ are pieces of key information different from each other, p=0, ..., m-1, and [α] is concealed information of α.

(A) A counting unit obtains count results $[c_0], \ldots, [c_{m-1}]$ through secure computation by using concealed elements $[x_{0,0}], [x_{0,r(0)-1}], \ldots, [x_{L-1,0}], \ldots, [x_{L-1,r(L-1)-1}]$. Here, each element $x_{i,j(i)}$ represents any one of the key information $k_0, \ldots, k_{m-1}$, and the number of elements representing the key information $k_p$ among the elements $x_{0,0}, \ldots, x_{0,r(0)-1}, \ldots, x_{L-1,0}, \ldots, x_{L-1,r(L-1)-1}$ is $c_p$.

(B) An equality check unit obtains equality check results $[eq_0], \ldots, [eq_{m-1}]$ through the secure computation by using count results $[c_0], \ldots, [c_{m-1}]$. Here, $eq_p = T$ when $c_p$ is L, and $eq_p = F$ when $c_p$ is not L, where T and F are different from each other.

(C) An output flag adding unit outputs the concealed operation result including the concealed key information $[k_p]$ and the equality check result $[eq_p]$ associated with each other.

Advantageous Effects of Invention

As a result, it is possible to handle not only concealed information of two sets but also concealed information of three or more sets as a direct input, and to directly obtain concealed information of a product set operation result of three or more sets.

DESCRIPTION OF EMBODIMENTS

Hereinafter, an embodiment of the present invention will be described with reference to the drawings.

Definitions of Terms

First, symbols used in the embodiment are defined. $X_i = \{x_{i,0}, \ldots, x_{i,r(i)-1}\}$ represents a set having $x_{i,0}, \ldots, x_{i,r(i)-1}$ as elements. i is an index of a set, and i=0, ..., L-1. L is an integer of 2 or greater representing the number of sets $X_0 = \{x_{0,0}, \ldots, x_{0,r(0)-1}\}, \ldots, X_{L-1} = \{x_{L-1,0}, \ldots, x_{L-1,r(L-1)-1}\}$. L may be 3 or greater. r(i) is an integer of 1 or greater representing the number of elements of the set $X_i$. r(i) may be 1, or may be 2 or greater. λ(i) is an index of the elements $x_{i,0}, \ldots, x_{i,r(i)-1}$ of the set $X_i$, and an element corresponding to the index λ(i) of the set $X_i$ is expressed as $x_{i,\lambda(i)}$. Here, λ(i)=0, ..., r(i)-1. Details (for example, numerical values, characters (letters, numbers, and the like), and dates and times) represented by the elements $x_{i,0}, \ldots, x_{i,r(i)-1}$ belonging to the same set $X_i$ are different from each other. That is, there is no overlap in the details respectively represented by the elements $x_{i,0}, \ldots, x_{i,r(i)-1}$ belonging to the same set $X_i$. This is the same as the definition of a normal set.

$(\kappa_0, \ldots, \kappa_{\Theta-1})$ represents a sequence of $\Theta$ elements $\kappa_0, \ldots, \kappa_{\Theta-1}$. For example, the sequence $(\kappa_0, \ldots, \kappa_{\Theta-1})$ is a vector having elements $K_0, \ldots, K_{\Theta-1}$, but there is no limitation to an implementation form of the sequence $(K_0, \ldots, K_{\Theta-1})$.

$[\alpha]$ represents concealed information of $\alpha$. That is, $[\alpha]$ represents information obtained by concealing $\alpha$. In a case where $\alpha$ is a sequence $(\kappa_0, \ldots, \kappa_{P-1})$ of a plurality of elements $\kappa_0, \ldots, \kappa_{P-1}$, respective sequences $[\kappa_0], \ldots, [\kappa_{P-1}]$ of the concealed information of the plurality of elements $\kappa_0, \ldots, \kappa_{P-1}$ included in $\alpha=(\kappa_0, \ldots, \kappa_{P-1})$ is also expressed as $[\alpha]$. However, the concealed information $[\alpha]$ is information for which secure computation can be performed. That is, it is possible to obtain concealed information $[\beta]$ of an operation result $\beta$ for $\alpha$ through secure computation by using the concealed information $[\alpha]$ while keeping a concealed. The secure computation may be based on secret sharing (refer to, for example, Non Patent Literature 1) or based on homomorphic encryption. In the former case, $[\alpha]$ is a share obtained by subjecting $\alpha$ to secret sharing (also referred to as a secret share or a secret sharing value). In the latter case, $[\alpha]$ is a ciphertext obtained by encrypting $\alpha$ according to the homomorphic encryption scheme.

<Secret Sharing>

The secret sharing is an encryption method in which data is divided into a plurality of values (shares) and shared to a plurality of parties. An example of the secret sharing is (K, N) threshold secret sharing. The (K, N) threshold secret sharing is a method in which original data is divided into N random shares and shared to a plurality of parties, and is a secret sharing method having a property that when K or more shares are collected, the original data can be restored, but information of the original data cannot be obtained from less than K shares. Here, K and N are positive integers satisfying K N. Specific examples of the (K, N) threshold secret sharing are Shamir secret sharing (refer to, for example, Reference Literature 1) and replicated secret sharing (refer to, for example, Reference Literatures 2 and 3). Reference Literature 1: Adi Shamir, "How to share a secret," Communications of the ACM, Vol. 22, No. 11, pp. 612-613, 1979. Reference Literature 2: Mitsuru Ito, Akira Saito, and Takao Nishizeki, "Secret sharing scheme realizing general access structure," Electronics and Communications in Japan (Part III: Fundamental Electronic Science), Vol. 72, No. 9, pp. 56-64, 1989. Reference Literature 3: Ronald Cramer, Ivan Damgard, and Yuval Ishai, "Share conversion, pseudorandom secret-sharing and applications to secure computation," In Theory of Cryptography Conference, pp. 342-362. Springer, 2005.

Hereinafter, an operation based on secure computation will be exemplified (refer to, for example, Non Patent Literature 1).

<Equality Check>

Equality check of concealed information $[\alpha_1]$ and $[\alpha_2]$ using secure computation means an operation that uses the concealed information $[\alpha_1]$ and $[\alpha_2]$ (for example, shares) of $\alpha_1$ and $\alpha_2$ as an input and outputs concealed information $[\beta]$ (for example, a share) of a true/false value $\beta \in \{T, F\}$ in which $\beta=T$ (true) when $\alpha_1$ is $\alpha_2$ and $\beta=F$ (false) when $\alpha_1$ is not $\alpha_2$. Here, T and F represent different values (T≠F), and for example, T=1 and F=0 may be used, or T=0 and F=1 may be used. The execution of this operation will be described as follows.

$$[\beta] \leftarrow E_Q([\alpha_1], [\alpha_2])$$

<Group-by Count>

Group-by Count of concealed information [A] using secure computation means a process in which the concealed information [A] of a set A is input, elements of the set A are grouped for each element representing the same details (for example, the same numerical value, the same character, or the same date and time) through the secure computation, and concealed information (concealed key information) $[k_p]$ of key information $k_p$ indicating details represented by elements belonging to each group $G_P$ and concealed information (count result) $[c_p]$ of the number $c_p$ of elements belonging to each group $G_P$ are obtained. Here, $p=0, \ldots, m-1$, and m is the number of groups $G_0, \ldots, G_{m-1}$. Elements belonging to the same group $G_P$ represent the same details, and elements belonging to different groups $G_{p1}$ and $G_{p2}$ (where p1, p2 ∈ {0, ..., m−1}) represent different details. That is, the elements of the set A represent any of the key information $k_0, \ldots, k_{m-1}$, and the number of elements representing the key information $k_p$ among the elements of the set A is $c_p$. The execution of this process will be described as follows.

$$([k], [c]) \leftarrow GroupbyCount([A]) \quad (1)$$

Here, [k] represents a sequence $([k_0], \ldots, [k_{m-1}])$, and [c] represents a sequence $([c_0], \ldots, [c_{m-1}])$.

An implementation method for realizing this is disclosed in Reference Literature 4 and the like.

Reference Literature 4: Ryo Kikuchi, Koki Hamada, Dai Ikarashi, Gen Takahashi. "Secure cross-sector customer-flow invention," In SCIS2020, pp. 1-8, 2020.

In order to conceal the number m of groups $G_0, \ldots, G_{m-1}$ of the set A, [k] and [c] further including dummy information and a flag sequence [f] for distinguishing between valid information and the dummy information may be obtained through Group-by Count (refer to, for example, Reference Literature 4). That is, Group-by Count of the concealed information [A] using secure computation may be a process of obtaining sequences ([f], [k], [c]) through secure computation with the concealed information [A] of the set A as an input. Here, the sequence [f] is a sequence including m valid flags $[f_0], \ldots, [f_{m-1}]$ and n−m dummy flags $[f_m], \ldots, [f_{n-1}]$. In addition, n is an integer greater than m, $f_0, \ldots, f_{m-1}$ are $B_1, f_m, \ldots, f_{n-1}$ are $B_0$, and $B_1$ and $B_0$ are different from each other. $B_1$ and $B_0$ may be any values, and for example, $B_1=1$ and $B_0=0$ may be used, or $B_1=0$ and $B_0=1$ may be used. It is desirable that the valid flags $[f_0], \ldots, [f_{m-1}]$ and the dummy flags $[f_m], \ldots, [f_{n-1}]$ are indistinguishable from each other as long as these are concealed. The sequence [k] is a sequence including m pieces of concealed key information $[k_0], \ldots, [k_{m-1}]$ and n−m pieces of dummy information $[k_m], \ldots, [k_{n-1}]$. It is desirable that the concealed key information $[k_0], \ldots, [k_{m-1}]$ and the dummy information $[k_m], \ldots, [k_{n-1}]$ are indistinguishable from each other as long as these are concealed. For example, the dummy information $[k_m], \ldots, [k_{n-1}]$ may be randomly selected information (for example, a random number) or concealed information of randomly selected information. The sequence [c] is a sequence including m count results $[c_0], \ldots, [c_{m-1}]$ and n−m pieces of dummy information $[c_m], \ldots, [c_{n-1}]$. It is desirable that the count results $[c_0], \ldots, [c_{m-1}]$ and the dummy information $[c_m], \ldots, [c_{n-1}]$ are indistinguishable from each other as long as these are concealed. For example, the dummy information $[c_m], \ldots, [c_{n-1}]$ may be randomly selected information (for example, a random number) or concealed information of randomly selected information. For $p=0, \ldots, m-1$, the valid flag $[f_p]$, the concealed key information $[k_p]$, and the count result $[c_p]$ are associated with each other, and for $q=m, \ldots, n-1$, the dummy flag $[f_q]$, the dummy information $[k_q]$, and the dummy information $[c_q]$ are associated with each other. In this case, Group-by Count of the concealed information [A] using secure computation is described as follows.

$$([f], [k], [c]) \leftarrow GroupbyCount([A]) \qquad (2)$$

First Embodiment

Figure 1:
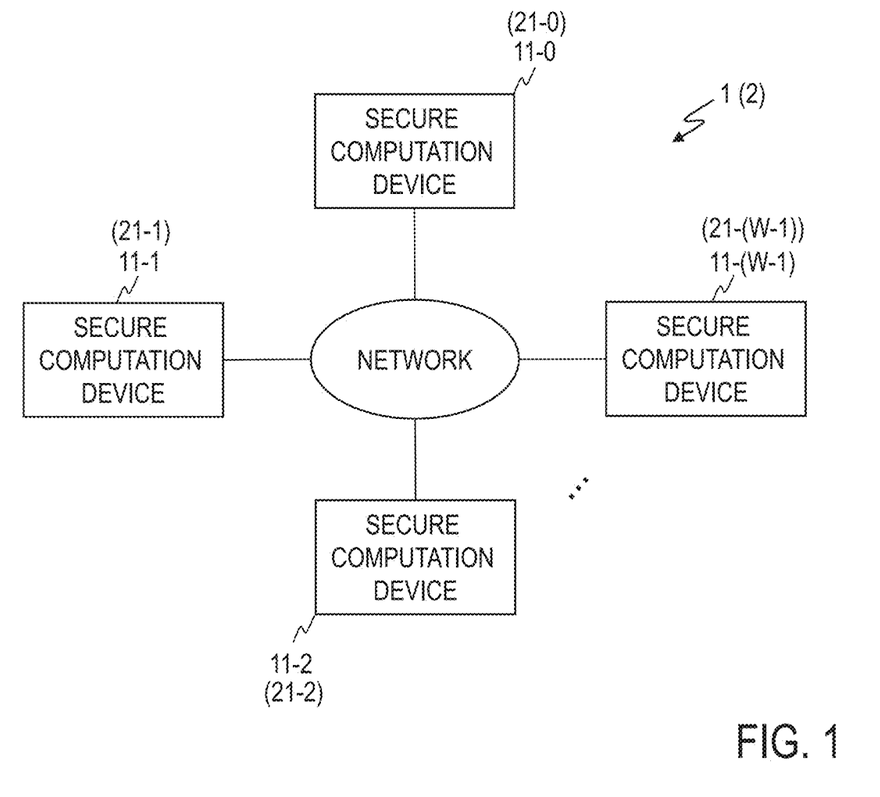
FIG. 1 is a block diagram illustrating a functional configuration of a secure computation system according to an embodiment.

Next, a first embodiment of the present invention will be described.
<Configuration>
As illustrated in FIG. 1, a secure computation system 1 of the first embodiment includes W secure computation devices 11-0, ..., 11-(W−1) configured to be able to communicate via a network. Here, W is an integer of 1 or greater. For example, in a case where the secure computation devices 11-0, ..., 11-(W−1) perform secure computation based on secret sharing, W is an integer of 2 or greater, and in a case where the secure computation based on homomorphic encryption is performed, W is an integer of 1 or greater.

Figure 2:
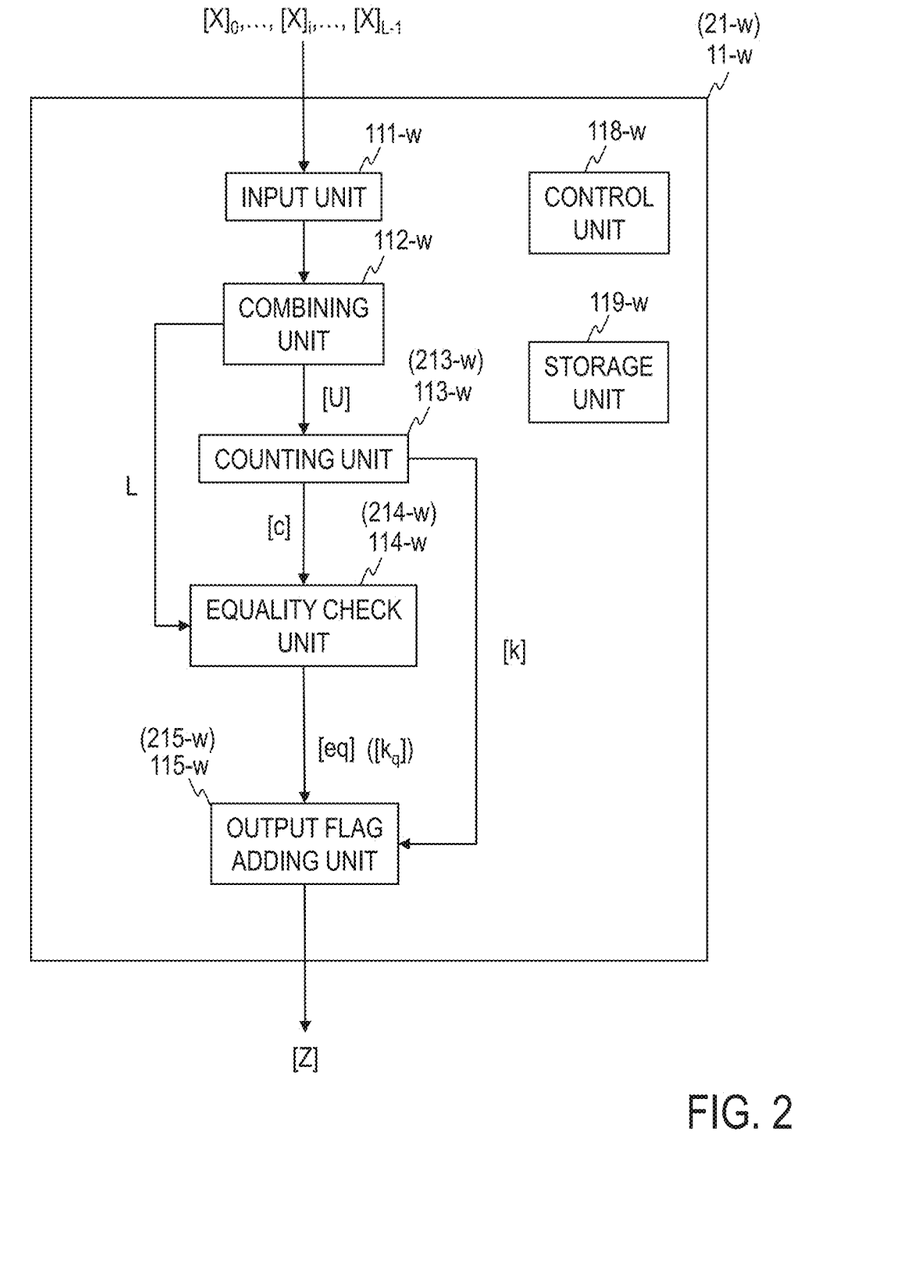
FIG. 2 is a block diagram illustrating a functional configuration of a secure computation device according to the embodiment.

As illustrated in FIG. 2, the secure computation device 11-$w$ (where $w=0, \ldots, W-1$) includes an input unit 111-$w$, a combining unit 112-$w$, a counting unit 113-$w$, an equality check unit 114-$w$, an output flag adding unit 115-$w$, a control unit 118-$w$, and a storage unit 119-$w$. The secure computation device 11-$w$ executes each process under the control of the control unit 118-$w$, and data input to the secure computation device 11-$w$ and data obtained in each process are stored in the storage unit 119-$w$, read as necessary, and used for other processes.
<Process>
The secure computation device 11-$w$ (where $w=0, \ldots, W-1$) obtains and outputs a concealed operation result [Z] of a data structure representing concealed information of an operation result of a product set $\cap_{0 \leq i \leq L-1} X_i$ of the sets $X_0, \ldots, X_{L-1}$ while concealing the L sets $X_0 = \{x_{0,0}, \ldots, x_{0,r(0)-1}\}, \ldots, X_{L-1} = \{x_{L-1,0}, \ldots x_{L-1,r(L-1)-1}\}$ through secure computation. As a specific example, for example, in a case where L=3, r(0)=4, r(1)=2, r(2)=2, elements of the three sets $X_0, X_1$, and $X_2$ represent letters, and $X_0 = \{a, b, e, g\}, X_1 = \{b, e\}$, and $X_2 = \{a, e\}$, a product set $\cap_{0 \leq i \leq 2} X_i$ of the sets $X_0, X_1$, and $X_2$ is {e}, and the secure computation device 11-$w$ obtains and outputs the concealed operation result [Z] representing [e]. A secure computation process of the secure computation device 11-$w$ will be described with reference to FIG. 3.

Figure 3:
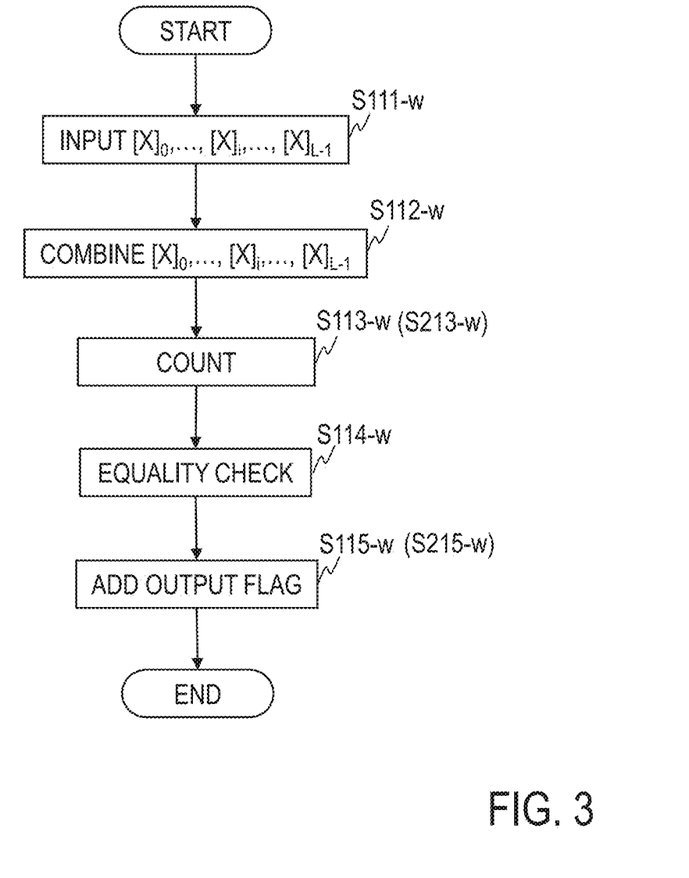
FIG. 3 is a flowchart illustrating a secure computation method according to the embodiment.

Concealment information $[X_0], \ldots, [X_{L-1}]$ of the L sets $X_0 = \{x_{0,0}, x_{0,r(0)-1}\}, \ldots, X_{L-1} = \{x_{L-1,0}, \ldots, x_{L-1,r(L-1)-1}\}$ is input to the input unit 111-$w$ of the secure computation device 11-$w$. In the above specific example, $[X_0] = \{[a], [b], [e], [g]\}, [X_1] = \{[b], [e]\}$, and $[X_2] = \{[a], [e]\}$ are input. $[X_0], \ldots, [X_{L-1}]$ may be sent from any of the W secure computation devices 11-0, ..., 11-(W−1), or may be sent from another device (not illustrated) (step S111-$w$).

$[X_0], \ldots, [X_{L-1}]$ are input to the combining unit 112-$w$. The combining unit 112-$w$ obtains and outputs a sequence [U] of concealed elements $[x_{0,0}], \ldots, [x_{0,r(0)-1}], \ldots, [x_{L-1,0}], \ldots, [X_{L-1,r(L-1)-1}]$ obtained by combining the elements of $[X_0], \ldots, [X_{L-1}]$. For example, the combining unit 112-$w$ obtains and outputs the following sequence [U] in which concealed elements $[x_{0,0}], \ldots, [x_{0,r(0)-1}], \ldots, [x_{L-1,0}], \ldots, [x_{L-1,r(L-1)-1}]$ are vertically arranged.

$$([U]) = \begin{pmatrix} [x_{0,0}] \\ \vdots \\ [x_{0,r(0)-1}] \\ \vdots \\ [x_{1,0}] \\ \vdots \\ [x_{1,r(1)-1}] \\ \vdots \\ [x_{L-1,0}] \\ \vdots \\ [x_{1,r(L-1)-1}] \end{pmatrix}$$

For example, in the case of the above specific example, $$[X_0] = \{[a], [b], [e], [g]\}, [X_1] = \{[b], [e]\}, \text{ and } [X_2] = \{[a], [e]\},$$

the combining unit 112-$w$ obtains and outputs the sequence [U] of the following Expression (3).

$$([U]) = \begin{pmatrix} [a] \\ [b] \\ [e] \\ [g] \\ [b] \\ [e] \\ [a] \\ [e] \end{pmatrix} \qquad (3)$$

The number L of $[X_0], \ldots, [X_{L-1}]$ is sent to the equality check unit 114-$w$, and the sequence [U] is sent to the counting unit 113-$w$ (step S112-$w$).

The sequence [U] is input to the counting unit 113-$w$. The counting unit 113-$w$ uses the concealed elements $[x_{0,0}], \ldots, [x_{0,r(0)-1}], \ldots, [x_{L-1,0}], \ldots, [x_{L-1,r(L-1)-1}]$ of the sequence [U] to obtain and output the sequence [c]= $([c_0], \ldots, [c_{m-1}])$ of the count results $[c_0], \ldots, [c_{m-1}]$ through secure computation. Here, j (i)=0, ..., r(i)−1, m is an integer of 1 or greater, $k_0, \ldots, k_{m-1}$ are pieces of key information different from each other, and p=0, ..., m−1. Each element $x_{i,j(i)}$ represents any one of the pieces of key information $k_0, \ldots, k_{m-1}$, and the number of elements representing the key information $k_p$ among the elements $x_{0,0}, \ldots, x_{0,r(0)-1}, \ldots, x_{L-1,0}, \ldots, x_{L-1,r(L-1)-1}$ is $c_p$.

The counting unit 113-$w$ may obtain the sequence [k]= $([k_0], \ldots, [k_{m-1}])$ of the concealed key information $[k_0], \ldots, [k_{m-1}]$ through secure computation by using the concealed elements $[x_{0,0}], \ldots, [x_{0,r(0)-1}], \ldots, [x_{L-1,0}], \ldots, [x_{L-1,r(L-1)-1}]$. That is, for example, the counting unit 113-$w$ may obtain and output sequences ([k], [c]) in the following Expression (4).

$$([k], [c]) = ([k_0], \ldots, [k_{m-1}], [c_0], \ldots, [c_{m-1}]) \qquad (4)$$

For example, the counting unit 113-$w$ may obtain the sequences ([k], [c]) as follows through Group-by Count shown in Expression (1).

$$([k], [c]) \leftarrow GroupbyCount([U]) \qquad (5)$$

For example, in the case of the sequence [U] exemplified in Expression (3), the following sequences ([k], [c]) are obtained according to Expression (5).

$$([k], [c]) = ([a], [b], [e], [g], [2], [2], [3], [1]) \qquad (6)$$

Here, [k]=([a], [b], [e], [g]) and [c]=([2], [2], [3], [1]).

The sequence [k]=([$k_0$], . . . , [$k_{m-1}$]) corresponding to the key information $k_0, \ldots, k_{m-1}$ is sent to the output flag adding unit 115-$w$, and the sequence [c]=([$c_0$], . . . , [$c_{m-1}$]) is sent to the equality check unit 114-$w$ (step S113-$w$).

The number L of [$X_0$], . . . , [$X_{L-1}$] and the sequence [c]=([$c_0$], . . . , [$c_{m-1}$]) are input to the equality check unit 114-$w$. The equality check unit 114-$w$ obtains and outputs equality check results [$eq_0$], . . . , [$eq_{m-1}$] through secure computation by using the number L and the count results [$c_0$], . . . , [$c_{m-1}$]. Here, $eq_p$=T when $c_p$ is L, and $eq_p$=F when $c_p$ is not L, where T and F are different from each other. For example, T=1 and F=0 may be used, or T=0 and F=1 may be used. For example, the equality check unit 114-$w$ performs the following computation for p=0, . . . , m−1 (that is, for [$c_p$] E [c]) (for example, the computation is performed in parallel for p=0, . . . , m−1).

$$[eq_p] \leftarrow E_Q([c_p], L)$$

For example, in the case of the sequence [c] exemplified in Expression (6), when T=1 and F=0, an equality check result shown in the following Expression (7) is obtained.

$$[eq_0] = [0], [eq_1] = [0], [eq_2] = [1], [eq_3] = [0], [eq_4] = [0] \qquad (7)$$

A sequence [eq] of the equality check results [$eq_0$], . . . , [$eq_{m-1}$] is sent to the output flag adding unit 115-$w$ (step S114-$w$).

The sequence [k]=([$k_0$], . . . , [$k_{m-1}$]) and the sequence [eq]=([$eq_0$], . . . , [$eq_{m-1}$]) are input to the output flag adding unit 115-$w$. The output flag adding unit 115-$w$ outputs the concealed operation result [Z]=([eq], [k]) including the concealed key information [$k_p$] and the equality check result [$eq_p$] associated with each other for p=0, . . . , m−1. For example, the output flag adding unit 115-$w$ outputs the following concealed operation result [Z].

$$[Z] = \begin{pmatrix} [eq_0] & [k_0] \\ \vdots & \vdots \\ [eq_{m-1}] & [k_{m-1}] \end{pmatrix}$$

For example, in the case of [k]=([a], [b], [e], [g]) exemplified in Expression (6) and [$eq_0$]=[0], [$eq_1$]=[0], [$eq_2$]=[1], [$eq_3$]=[0], and [$eq_4$]=[0] exemplified in Expression (7), the following concealed operation result [Z] is output.

$$[Z] = \begin{pmatrix} [0] & [a] \\ [0] & [b] \\ [1] & [e] \\ [0] & [g] \end{pmatrix} \qquad (8)$$

In the concealed operation result [Z], [1] is associated with [e] corresponding to {e} that is the product set $\cap_{0 \le i \le 2} X_i$ of the sets $X_0$, $X_1$, and $X_2$, and [0] is associated with the other [a], [b], and [g].

Features of Present Embodiment

Assuming that there is no overlap in details represented by the elements $x_{i,0}, \ldots, x_{i,r(i)-1}$ belonging to the same set $X_i$ for the set $X_0 = \{x_{0,0}, \ldots, x_{0,r(0)1}\}, \ldots, X_{L-1} = \{x_{L-1,0}, \ldots, x_{L-1,r(L-1)-1}\}$, the fact that the number $c_p$ (elements representing the key information $k_p$) of the elements corresponding to the count result [$c_p$] obtained by the counting unit 113-$w$ is equal to the number L of the sets $X_0, \ldots, X_{L-1}$ means that one element representing the same key information $k_p$ is included in each of the sets $X_0, \ldots, X_{L-1}$. Thus, the key information $k_p$ satisfying [$eq_p$]=[T] (for example, [1]) in the equality check unit 114-$w$ is an element of a set that is an operation result of the product set $\cap_{0 \le i \le L-1} X_i$ of the sets $X_0, \ldots, X_{L-1}$. Therefore, a data structure of the concealed operation result [Z]=([eq], [k]) including the concealed key information [$k_p$] and the equality check result [$eq_p$] associated with each other represents concealed information of an operation result of the product set $\cap_{0 \le i \le L-1} X_i$.

The method of the present embodiment can be applied without any change regardless of whether the number L of the sets $X_0, \ldots, X_{L-1}$ is two or three or more, and concealed information of three or more sets $X_0, \ldots, X_{L-1}$ can also be handled as a direct input, and concealed information of a product set operation result of the three or more sets $X_0, \ldots, X_{L-1}$ can also be directly obtained. The process of the counting unit 113-$w$ is executed on the concealed information [U] of U obtained by combining the sets $X_0, \ldots, X_{L-1}$, and can be directly executed through one-time Group-by Count or the like regardless of a value of L. Since the number of bits of L compared by the equality check unit 114-$w$ is small ($\log_2(L)$), the computation cost is also small. Since there is no order dependency on p in equality check between [$c_p$] and L, it is possible to perform computation in parallel for p=0, . . . , m−1, and it is possible to perform computation at high speed. In particular, the method of the present embodiment is particularly effective in a case where the number of sets $X_0, \ldots, X_{L-1}$ is large, or in an environment where the influence of a length of an execution time is large, for example, a network environment with a large delay.

The concealed operation result [Z] may be used to restore Z, or may be used as an operand for subsequent secure computation.

Second Embodiment

Next, a second embodiment of the present invention will be described. The sequence [k]=([$k_0$], . . . , [$k_{m-1}$]) obtained by the counting unit 113-$w$ of the first embodiment is obtained by concealing the key information $k_0, \ldots, k_{m-1}$, and the sequence [c]=([$c_0$], . . . , [$c_{m-1}$]) is obtained by concealing the numbers $c_0, \ldots, c_{m-1}$ of elements coinciding with the key information $k_0, \ldots, k_{m-1}$ among the elements $x_{0,0}, \ldots, x_{0,r(0)-1}, \ldots, x_{L-1,0}, \ldots, x_{L-1,r(L-1)-1}$. Thus, the key information $k_0, \ldots, k_{m-1}$ and the number of elements $c_0, \ldots, c_{m-1}$ are concealed, but the number m of $[k_0], \ldots, [k_{m-1}]$ and the number m of $[c_0], \ldots, [c_{m-1}]$ are not concealed, that is, it is not concealed that the elements of the set $X_0, \ldots, X_{L-1}$ are divided into m groups. Dummy information may be added to conceal this. Hereinafter, description will focus on differences from the first embodiment, and description of portions already described will be simplified by using the same reference numerals and symbols.

<Configuration>

As illustrated in FIG. 1, a secure computation system 2 of the second embodiment includes W secure computation devices 21-0, ..., 21-(W−1) configured to be able to communicate via a network. Here, W is an integer of 1 or greater. For example, in a case where the secure computation devices 21-0, ..., 21-(W−1) perform secure computation based on secret sharing, W is an integer of 2 or greater, and in a case where the secure computation based on homomorphic encryption is performed, W is an integer of 1 or greater.

As illustrated in FIG. 2, the secure computation device 21-w (where w=0, ..., W−1) includes an input unit 111-w, a combining unit 112-w, a counting unit 213-w, an equality check unit 214-w, an output flag adding unit 215-w, a control unit 118-w, and a storage unit 119-w. The secure computation device 21-w executes each process under the control of the control unit 118-w, and data input to the secure computation device 11-w and data obtained in each process are stored in the storage unit 119-w, read as necessary, and used for other processes.

<Process>

The concealed information $[X_0], \ldots, [X_{L-1}]$ of the L sets $X_0=\{x_{0,0}, \ldots, x_{0,r(0)-1}\}, \ldots, X_{L-1}=\{x_{L-1,0}, \ldots, x_{L-1,r(L-1)-1}\}$ is input to the input unit 111-w of the secure computation device 21-w (step S111-w).

$[X_0], \ldots, [X_{L-1}]$ are input to the combining unit 112-w. The combining unit 112-w obtains and outputs a sequence [U] of concealed elements $[x_{0,0}], \ldots, [x_{0,r(0)-1}], \ldots, [x_{L-1,0}], \ldots, [x_{L-1,r(L-1)-1}]$ obtained by combining the elements of $[X_0], \ldots, [X_{L-1}]$ (step S112-w).

The sequence [U] is input to the counting unit 213-w. The counting unit 213-w obtains and outputs the sequences ([f], [k], [c]) through secure computation by using the concealed elements $[x_{0,0}], \ldots, [x_{0,r(0)-1}], \ldots, [x_{L-1,0}], \ldots, [x_{L-1,r(L-1)-1}]$ of the sequence [U]. The sequence [f] is a sequence including m valid flags $[f_0], \ldots, [f_{m-1}]$ and n−m dummy flags $[f_m], \ldots, [f_{n-1}]$, $f_0, \ldots, f_{m-1}$ are $B_1$, $f_m, \ldots, f_{n-1}$ are $B_0$, and $B_1$ and $B_0$ are different from each other. Here, n is an integer greater than m.

The sequence [k] is a sequence including m pieces of concealed key information $[k_0], \ldots, [k_{m-1}]$ and n−m pieces of dummy information $[k_m], \ldots, [k_{n-1}]$. Each of $k_m, \ldots, k_{n-1}$ corresponding to the dummy information $[k_m], \ldots, [k_{n-1}]$ may match any of the key information $k_0, \ldots, k_{m-1}$, or may not match any of the key information $k_0, \ldots, k_{m-1}$. The sequence [c] is a sequence including m count results $[c_0], \ldots, [c_{m-1}]$ and n−m pieces of dummy information $[c_m], \ldots, [c_{n-1}]$. For p=0, ..., m−1, the valid flag $[f_p]$, the concealed key information $[k_p]$, and the count result $[c_p]$ are associated with each other. Each of $c_m, \ldots, c_{n-1}$ corresponding to the dummy information $[c_m], \ldots, [c_{n-1}]$ is different from L. For q=m, ..., n−1, the dummy flag $[f_q]$, the dummy information $[k_q]$, and the dummy information $[c_q]$ are associated with each other. For example, the counting unit 213-w obtains and outputs the sequences ([f], [k], [c]) in the following Expression (9).

$$([f], [k], [c]) = ([B_1], \ldots, [B_1], [B_0], \ldots, [B_0], [k_0], \ldots, [k_{m-1}], [k_m], \ldots, [k_{n-1}], [c_0], \ldots, [c_{m-1}], [c_m], \ldots, [c_{n-1}])$$

For example, the counting unit 213-w may obtain the sequences ([f], [k], [c]) as follows through Group-by Count shown in Expression (2).

$$([f], [k], [c]) \leftarrow GroupbyCount([U]) \qquad (9)$$

For example, in the case of the sequence [U] exemplified in Expression (3) with m=4 and n=5, the following sequences ([f], [k], [c]) is obtained according to Expression (9).

$$([f], [k], [c]) = \qquad (10)$$
$$([1], [1], [1], [1], [0], [a], [b], [e], [g], [*], [2], [2], [3], [1], [*])$$

where:

$[f] = ([1], [1], [1], [1], [0])$, $[k] = ([a], [b], [e], [g], [*])$, $[c] = ([2], [2], [3], [1], [*])$

[*] represents dummy information.

The sequence $[k]=([k_0], \ldots, [k_{m-1}], [k_m], \ldots, [k_{n-1}])$ is sent to the output flag adding unit 215-w, and the sequence $[c]=([c_0], \ldots, [c_{m-1}], [c_m], \ldots, [c_{n-1}])$ is sent to the equality check unit 214-w (step S213-w).

The number L of $[X_0], \ldots, [X_{L-1}]$ and the sequence $[c]=([c_0], \ldots, [c_{m-1}], [c_m], \ldots, [c_{n-1}])$ are input to the equality check unit 214-w. The equality check unit 214-w obtains equality check results $[eq_0], \ldots, [eq_{m-1}]$ and dummy information $[eq_m], \ldots, [eq_{n-1}]$ through secure computation by using the sequences ([f], [k], [c]), and obtains and outputs a sequence $[eq]=([eq_0], \ldots, [eq_{m-1}], [eg_m], \ldots, [eq_{n-1}])$ including the equality check results and the dummy information. $[eq_0], \ldots, [eg_{m-1}]$ for p=0, ..., m−1 are the same as those in the first embodiment. $[eg_m], \ldots, [eq_{n-1}]$ for q=m, ..., n−1 are concealed information of $eq_m, \ldots, eq_{n-1}$. However, $eq_q$=T when $c_q$ is L, and $eq_q$=F when $c_q$ is not L, where T and F for q=m, ..., n−1 are the same as for p=0, ..., m−1, and T and F are different from each other. As described above, $c_m, \ldots, c_{n-1}$ do not match L, so that $eq_m= \ldots =eg_{n-1}$=F, and $$([eq_m], \ldots, [eq_{n-1}]) = ([F], \ldots, [F]).$$

For example, the equality check unit 214-w performs the following computation for u=0, ..., n−1 (that is, for $[c_u]\in[c]$) (for example, computation is performed in parallel for u=0, ..., n−1).

$$[eq_u] \leftarrow E_Q([c_u], L)$$

For example, in the case of the sequence [c] exemplified in Expression (10), when T=1 and F=0, an equality check result shown in the following Expression (11) is obtained.

$$[eq_0] = [0], [eq_1] = [0], [eq_2] = [1], [eq_3] = [0], [eq_4] = [0], [eq_5] = [0] \quad (11)$$

The sequence [eq] of the equality check results $[eq_0], \ldots, [eq_{n-1}]$ is sent to the output flag adding unit 215-$w$ (step S214-$w$).

The sequence $[k]=([k_0], \ldots, [k_{n-1}])$ and the sequence $[eq]=([eq_0], \ldots, [eq_{n-1}])$ are input to the output flag adding unit 215-$w$. The output flag adding unit 215-$w$ outputs the concealed key information $[k_p]$ and the equality check result $[eq_p]$ associated with each other for $p=0, \ldots, m-1$, and the concealed operation result [Z]=([eq], [k]) including the dummy information $[k_q]$ and the dummy information $[eq_q]$ associated with each other for $q=m, \ldots, n-1$. For example, the output flag adding unit 215-$w$ outputs the following concealed operation result [Z].

$$[Z] = \begin{pmatrix} [eq_0] & [k_0] \\ \vdots & \vdots \\ [eq_{m-1}] & [k_{m-1}] \\ [eq_m] & [k_m] \\ \vdots & \vdots \\ [eq_{n-1}] & [k_{n-1}] \end{pmatrix}$$

For example, in the case of $[k]=([a], [b], [e], [g], [*])$ exemplified in Expression (10) and $[eq_0]=[0]$, $[eq_1]=[0]$, $[eq_2]=[1]$, $[eq_3]=[0]$, $[eq_4]=[0]$, and $[eq_5]=[0]$ exemplified in Expression (11), the following concealed operation result [Z] is output.

$$[Z] = \begin{pmatrix} [0] & [a] \\ [0] & [b] \\ [1] & [e] \\ [0] & [g] \\ [0] & [*] \end{pmatrix} \quad (12)$$

In the concealed operation result [Z], [1] is associated with [e] corresponding to {e} that is a product set $\cap_{0 \leq i \leq 2} X_i$ of the sets $X_0$, $X_1$, and $X_2$, and [0] is associated with the other [a], [b], [g], and [*].

Features of Present Embodiment

Assuming that there is no overlap in details represented by the elements $x_{1,0}, \ldots, x_{i,r(i)-1}$ belonging to the same set $X_i$ for the set $X_0=\{x_{0,0}, \ldots, x_{0,r(0)-1}\}, \ldots, X_{L-1}=\{(x_{L-1,0}, \ldots, x_{L-1,r(L-1)-1}\}$, the fact that the number $c_p$ (elements representing the key information $k_p$) of the elements corresponding to the count result $[c_p]$ (where $p=0, \ldots, m-1$) obtained by the counting unit 213-$w$ is equal to the number L of the sets $X_0, \ldots, X_{L-1}$ means that one element representing the same key information $k_p$ is included in each of the sets $X_0, \ldots, X_{L-1}$. In addition, each of $c_m, \ldots, c_{n-1}$ corresponding to the dummy information $[c_m], \ldots, [c_{n-1}]$ is different from L. Thus, the key information $k_u$ satisfying $[eq_u]=[T]$ (where $u=0, \ldots, n-1$) in the equality check unit 214-$w$ is an element of a set that is an operation result of the product set $\cap_{0 \leq i \leq L-1} X_i$ of the sets $X_0, \ldots, X_{L-1}$. Each of $k_m, \ldots, k_{n-1}$ corresponding to the dummy information $[k_m], \ldots, [k_{n-1}]$ does not coincide with any of the actual key information $k_0, \ldots, k_{m-1}$ of the sets $X_0, \ldots, X_{L-1}$. Therefore, a data structure of the concealed operation result [Z]=([eq], [k]) including the concealed key information $[k_u]$ and the equality check result $[eq_u]$ associated with each other represents concealed information of the operation result of the product set $\cap_{0 \leq i \leq L-1} X_i$.

The method of the present embodiment can be applied without any change regardless of whether the number L of the sets $X_0, \ldots, X_{L-1}$ is two or three or more, and concealed information of three or more sets $X_0, \ldots, X_{L-1}$ can also be handled as a direct input, and concealed information of a product set operation result of the three or more sets $X_0, \ldots, X_{L-1}$ can also be directly obtained. The process of the counting unit 213-$w$ is executed on the concealed information [U] of U obtained by combining the sets $X_0, \ldots, X_{L-1}$, and can be directly executed through one-time Group-by Count or the like regardless of a value of L. Since the number of bits of L compared by the equality check unit 214-$w$ is small ($\log_2$ (L)), the computation cost is also small. Since there is no order dependency on u in equality check between $[c_u]$ and L, it is possible to perform computation in parallel for $u=0, \ldots, n-1$, and it is possible to perform computation at high speed. The method of the present embodiment is also particularly effective in a case where the number of sets $X_0, \ldots, X_{L-1}$ is large, or in an environment where the influence of a length of an execution time is large, for example, a network environment with a large delay. The sequences ([f], [k], [c]), the sequence [eq], and the concealed operation result [Z] obtained in the present embodiment all include dummy information, and it is also concealed that the elements of the sets $X_0, \ldots, X_{L-1}$ are divided into m groups. Therefore, the method of the present embodiment has higher safety.

The concealed operation result [Z] may be used to restore Z, or may be used as an operand for subsequent secure computation. For example, an invalid element (row) corresponding to the dummy information may be deleted from the concealed operation result [Z] according to the method disclosed in Reference Literature 5 or the like, and an obtained result may be used for another database operation.
Reference Literature 5: Hiroki Sudo, Dai Ikarashi, "Implementation and evaluation of a secure computation database management system that discloses only the number of rows" In SCIS2021, pp. 1-6, 2021.

[Hardware Configuration]

The secure computation devices 11-$w$ and 21-$w$ in the embodiments are devices configured by a general-purpose or dedicated computer including, for example, a processor (hardware processor) such as a central processing unit (CPU) or a memory such as a random-access memory (RAM) or a read-only memory (ROM) executing a predetermined program. That is, the secure computation devices 11-$w$ and 21-$w$ in the respective embodiments each have, for example, processing circuitry configured to implement each unit included therein. The computer may include one processor and one memory, or may include a plurality of processors and a plurality of memories. The program may be installed in the computer, or may be recorded in a ROM or the like in advance. Some or all of the processing units may be configured by using an electronic circuit that executes a processing function alone instead of an electronic circuit (circuitry) that realizes a functional configuration by reading the program like a CPU. An electronic circuit configuring one device may include a plurality of CPUs.

Figure 4:
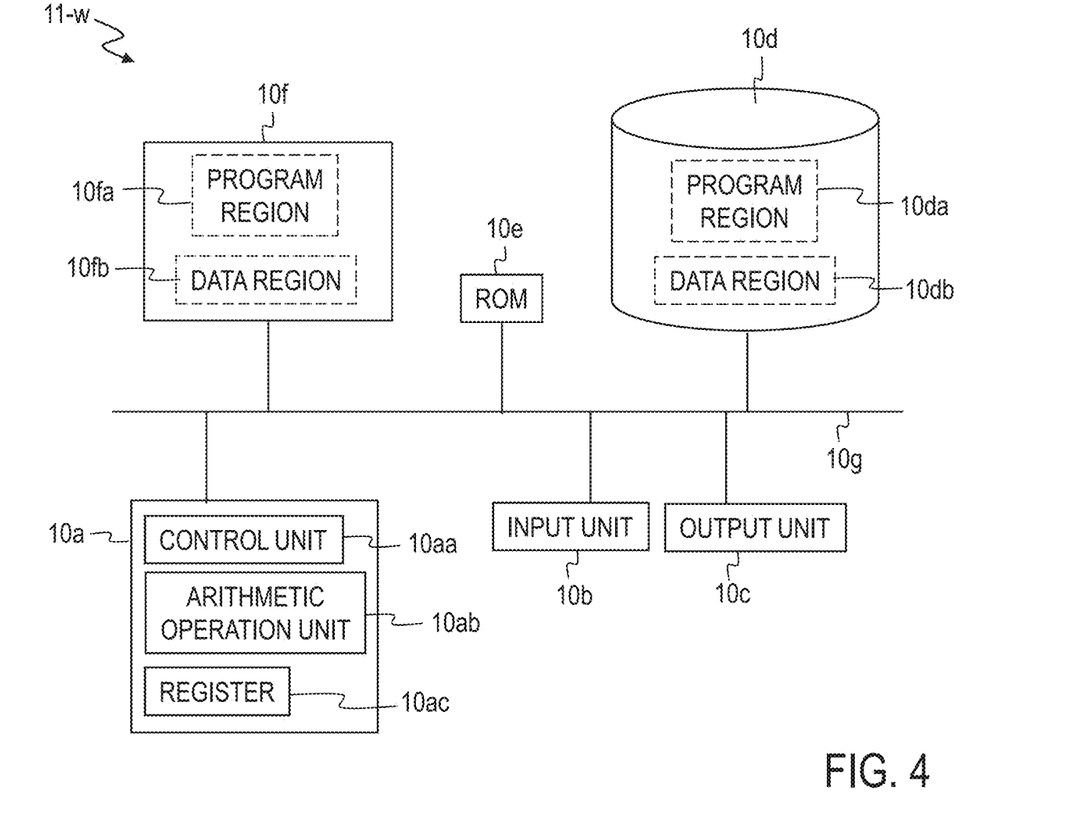
FIG. 4 is a block diagram illustrating a hardware configuration of the secure computation device according to the embodiment.

FIG. 4 is a block diagram illustrating a hardware configuration of the secure computation devices 11-w and 21-w in the respective embodiments. As illustrated in FIG. 4, the secure computation devices 11-w and 21-w of this example include a central processing unit (CPU) 10a, an input unit 10b, an output unit 10c, a random access memory (RAM) 10d, a read only memory (ROM) 10e, an auxiliary storage device 10f, and a bus 10g. The CPU 10a in this example includes a control unit 10aa, an operation unit 10ab, and a register 10ac, and performs various operation processes in accordance with various programs read into the register 10ac. The input unit 10b is an input terminal to which data is input, a keyboard, a mouse, a touch panel, or the like. The output unit 10c is an output terminal from which data is output, a display, a LAN card controlled by the CPU 10a that has read a predetermined program, or the like. The RAM 10d is a static random access memory (SRAM), a dynamic random access memory (DRAM), or the like, and incudes a program region 10da in which a predetermined program is stored and a data region 10db in which various kinds of data are stored. The auxiliary storage device 10f is, for example, a hard disk, a magneto-optical disc (MO), or a semiconductor memory, and includes a program region 10fa in which a predetermined program is stored and a data region 10fb in which various kinds of data are stored. The bus 10g connects the CPU 10a, the input unit 10b, the output unit 10c, the RAM 10d, the ROM 10e, and the auxiliary storage device 10f such that information can be exchanged among these constituents. The CPU 10a writes, into the program region 10da of the RAM 10d, the program stored in the program region 10fa of the auxiliary storage device 10f, in accordance with a read operating system (OS) program. Similarly, the CPU 10a writes, into the data region 10db of the RAM 10d, the various kinds of data stored in the data region 10fb of the auxiliary storage device 10f. Addresses in the RAM 10d at which the program and the data are written are stored into the register 10ac of the CPU 10a. The control unit 10aa of the CPU 10a sequentially reads these addresses stored in the register 10ac, reads the program and the data from the regions in the RAM 10d indicated by the read addresses, causes the operation unit 10ab to sequentially execute operations indicated by the program, and stores results of the operations into the register 10ac. With such a configuration, the functional configurations of the secure computation devices 11-w and 21-w are realized.

The above program may be recorded in a computer-readable recording medium. The computer-readable recording medium is, for example, a non-transitory recording medium. Examples of such a recording medium include a magnetic recording device, an optical disc, a magneto-optical recording medium, and a semiconductor memory.

The program is distributed by selling, giving, or renting portable recording media such as DVDs or CD-ROMs recording the program thereon. A configuration in which the program is stored in a storage device in a server computer and the program is distributed by transferring the program from the server computer to other computers via a network may also be employed. As described above, the computer executing such a program first stores the program recorded in the portable recording medium or the program transferred from the server computer temporarily into a storage device of the computer, for example. The computer then reads the program stored in the storage device, and performs a process in accordance with the read program at the time of execution of the process. In other execution modes of the program, the computer may read the program directly from the portable recording medium and performs a process in accordance with the program, or alternatively, the computer may sequentially execute a process in accordance with the received program every time the program is transferred from the server computer to the computer. The above process may be executed by a so-called application service provider (ASP) service that realizes a processing function only by issuing an instruction to execute the program and acquiring a result, without transferring the program from the server computer to the computer. The program in the present embodiment includes information used for processing of an electronic computer and equivalent to the program (data or the like that is not direct command to the computer but has property for defining processing of the computer).

Although this device is configured with a computer executing a predetermined program in each embodiment, at least some of the processing contents may be realized by hardware.

The present invention is not limited to the embodiments described above. For example, the processes may be executed not only in time series according to the description, but also in parallel or individually according to the processing capability of a device that executes the processes or as necessary. Further, needless to say, appropriate modifications can be made without departing from the scope of the present invention.

INDUSTRIAL APPLICABILITY

The present invention can be applied to an application in which a product-sum operation is performed on two or greater sets through secure computation. For example, the present invention can be used for performing a product-sum operation in a relational database management system (RDBMS) through secure computation.

REFERENCE SIGNS LIST

1 Secure computation system
11-w, 21-w Secure computation device
113-w, 213-w Counting unit
114-w, 214-w Equality check unit
115-w, 215-w Output flag adding unit

The invention claimed is:

1. A secure computation device that obtains a concealed operation result representing concealed information of a product set of L sets $X_0, \ldots, X_{L-1}$ while concealing sets $X_0 = \{x_{0,0}, \ldots, x_{0,r(0)-1}\}, \ldots, X_{L-1} = \{X_{L-1,0}, \ldots, X_{L-1,r(L-1)-1}\}$, L being an integer of 2 or greater, i=0, ..., L−1, r(i) being an integer of 1 or greater, j(i)=0, ..., r(i)-1, m being an integer of 1 or greater, $k_0, \ldots, k_{m-1}$ being pieces of key information different from each other, p=0, ..., m−1, and [α] being concealed information of α, the secure computation device comprising processing circuitry configured to:

(A) obtain count results $[c_0], \ldots, [c_{m-1}]$ through secure computation by using concealed elements $[x_{0,0}], \ldots, [X_{0,r(0)-1}], \ldots, [X_{L-1,0}], \ldots, [X_{L-1,r(L-1)-1}]$ where each element $x_{i,j(i)}$ represents any one of the key information $k_0, \ldots, k_{m-1}$, and a number of elements representing key information $k_p$ among elements $X_{0,0}, \ldots, X_{0,r(0)-1}, \ldots, X_{L-1,0}, \ldots, X_{L-1,r(L-1)-1}$ is $C_p$;

(B) obtain equality check results $[eq_0], \ldots, [eq_{m-1}]$ through the secure computation by using count results $[c_0], \ldots, [C_{m-1}]$, where $eq_p = T$ when $c_p$ is L, $eq_p = F$ when $c_p$ is not L, and T and F are different from each other; and (C) output the concealed operation result including concealed key information $[k_p]$ and a equality check result $[eq_p]$ associated with each other, wherein the processing circuitry is configured to further obtain concealed key information $[k_0], \ldots, [k_{m-1}]$ through the secure computation by using the concealed elements $[x_{0,0}], \ldots, [X_{0,r(0)-1}], \ldots, [X_{L-1,0}], \ldots, [X_{L-1,r(L-1)-1}]$.

2. The secure computation device according to claim 1, wherein n is an integer greater than m, (A) the processing circuitry is configured to obtain sequences ($[f], [k], [c]$), where a sequence $[f]$ is a sequence including m valid flags $[f_0], \ldots, [f_{m-1}]$ and n−m dummy flags $[f_m], \ldots, [f_{n-1}]$, where $f_0, \ldots, f_{m-1}$ are $B_1$, $f_m, \ldots, f_{n-1}$ are $B_0$, and $B_1$ and $B_0$ are different from each other, a sequence $[k]$ is a sequence including m pieces of concealed key information $[k_0], \ldots, [k_{m-1}]$ and n−m pieces of dummy information $[k_m], \ldots, [k_{n-1}]$, a sequence $[c]$ is a sequence including m count results $[c_0], \ldots, [c_{m-1}]$ and n−m pieces of dummy information $[c_m], \ldots, [C_{n-1}]$, for $p=0, \ldots, m-1$, a valid flag $[f_p]$, a concealed key information $[k_p]$, and a count result $[c_p]$ are associated with each other, and for $q=m, \ldots, n-1$, a dummy flag $[f_q]$, a dummy information $[k_q]$, and a dummy information $[c_q]$ are associated with each other, (B) the processing circuitry is configured to obtain equality check results $[eq_0], \ldots, [eq_{m-1}]$ and dummy information $[eq_m], \ldots, [eq_{n-1}]$ through the secure computation by using the sequences ($[f], [k], [c]$), and (C) the processing circuitry is configured to output the concealed operation result including the concealed key information $[k_p]$ and the equality check result $[eq_p]$ associated with each other for $p=0, \ldots, m-1$, and the dummy information $[k_q]$ and a dummy information $[eq_q]$ associated with each other for $q=m, \ldots, n-1$.

3. The secure computation device according to claim 1, wherein L is an integer of 3 or greater.

4. A secure computation system comprising the secure computation device according to claim 1.

5. A secure computation method by a secure computation device that obtains a concealed operation result representing concealed information of a product set of L sets $X_0, \ldots, X_{L-1}$ while concealing sets $X_0=\{x_{0,0}, \ldots, X_{0,r(0)-1}\}, \ldots, X_{L-1}=\{X_{L-1,0}, \ldots, X_{L-1,r(L-1)-1}\}$, L being an integer of 2 or greater, $i=0, \ldots, L-1$, $r(i)$ being an integer of 1 or greater, $j(i)=0, \ldots, r(i)-1$, m being an integer of 1 or greater, $k_0, \ldots, k_{m-1}$ are pieces of key information different from each other, $p=0, \ldots, m-1$, and $[\alpha]$ being concealed information of a, the secure computation method comprising:

(A) a counting step of obtaining count results $[c_0], \ldots, [c_{m-1}]$ through secure computation by using concealed elements $[x_{0,0}], \ldots, [x_{0,r(0)-1}], \ldots, [X_{L-1,0}], \ldots, [X_{L-1,r(L-1)-1}]$ where each element $X_{i,j(i)}$ represents any one of the key information $k_0, \ldots, k_{m-1}$, and a number of elements representing key information $k_p$ among elements $X_{0,0}, \ldots, X_{0,r(0)-1}, \ldots, X_{L-1,0}, \ldots, X_{L-1,r(L-1)-1}$ is $C_p$;

(B) an equality check step of obtaining equality check results $[eq_0], \ldots, [eq_{m-1}]$ through the secure computation by using count results $[c_0], \ldots, [C_{m-1}]$, where $eq_p=T$ when $c_p$ is L, $eq_p=F$ when $c_p$ is not L, and T and F are different from each other; and (C) an output flag adding step of outputting the concealed operation result including concealed key information $[k_p]$ and a equality check result $[eq_p]$ associated with each other, wherein the method further comprises obtaining concealed key information $[k_0], \ldots, [k_{m-1}]$, through the secure computation by using the concealed elements $[X_{0,0}], \ldots, [X_{0,r(0)-1}], \ldots, [X_{L-1,0}], \ldots, [X_{L-1,r(L-1)-1}]$.

6. A non-transitory computer-readable recording medium storing a program for causing a computer to function as the secure computation device according to claim 1.

* * * * *